UNITED STATES PATENT OFFICE 2,463,404

PROCESS FOR THE PRODUCTION OF BORON ARTICLES

Theodore D. McKinley, Avondale, Pa., assignor to E. I. du Pont de Nemours & Company, Wilmington, Del., a corporation of Delaware No Drawing. Application March 2, 1945, Serial No. 580,720

4 Claims. (Cl. 25—157)

This invention relates to the production of boron articles, and more particularly to the production of sintered boron articles from a pure powdered boron product of high quality.

Boron has been produced from the oxide and the chloride in several different ways and in different states of aggregation. The oxide of boron has been reduced by means of an element such as magnesium, and the resulting boron has not been obtained in pure form. The physical properties of the element thus produced are modified by the presence of compounds of boron and magnesium and this is particularly true of the electrical properties.

Boron has also been produced by the passage of a mixture of boron chloride and hydrogen over a hot tungsten wire. The chloride is reduced in part under these conditions and the boron is deposited on the wire. It is not possible to produce boron of high purity by this method due to the union between the tungsten and the boron, giving a binary compound of the two elements. Accordingly, these prior art boron preparations contain substantial amounts of impurities, which not only modify the properties of the boron, but also make the obtained product non-uniform and quite variable from sample to sample.

The ability to sinter boron to get rigid boron articles has been found to depend on the purity of the boron, and in this respect these prior art boron products are not suited for the production of sintered articles. It appears that the impurities present inhibit the sintering operation, and accordingly the heating of a pressed compact of boron of this quality does not yield a satisfactory article.

It is an object of this invention to produce a sintered boron article by heat treatment of substantially pure powered boron which is characterized by its freedom from oxides and other oxygen containing compounds as well as reducing metals. A further object is the production of sintered boron at a temperature substantially below the melting point of elementary boron in the absence of gases which react with the boron to give boron compounds. A still further object is the production of a sintered boron article with the aid of a hydrogen atmosphere.

The above and other objects are obtained in a process which comprises a heat treatment of powdered boron such as is obtained through the reduction of boron bromide by hydrogen at an elevated temperature and with the avoidance of the boron product being exposed to oxygen containing gases during or subsequent to its manufacture.

The first requirement in the production of these sintered boron articles is the preparation of a pure powdered boron. As explained above, the product resulting from the reduction of boron chloride by passing the mixed gases over a hot wire made of tungsten gives an unsatisfactory product. The reduction of boron chloride required a very high temperature and under such conditions the boron chloride is quite corrosive. This results in contamination from the container used. Boron bromide is more easily reduced by hydrogen and the halide reactant in this instance is less corrosive. The reaction product is extremely pure and, by exercising care, a product substantially free of oxygen is easily made. This product is well suited for the sintering operation as it is made in the presence of hydrogen and any bromine or hydrogen which remains on it are volatilized during the sintering operation.

The particle size of the boron will depend somewhat on the temperature used in its preparation, which may vary from 700° to 1000° C. and also on the ratio of boron bromide to hydrogen used in the reaction. In any event the boron is in the form of a fine powder and this may be shaped or compacted prior to heating at a temperature of around 2000° C. Oxygen and nitrogen containing gases must be excluded from the system and hydrogen may be admitted either at atmospheric pressure or at a reduced pressure by applying a vacuum, although pressures in excess of atmosphere may be used but are not recommended due to the dangers involved. Sintering temperatures within the range of 1800 to 2200° C. have been used and it is to be noted that even the top of this temperature range is considerably below the melting point of boron or 2300° C. Helium or other inert gas in admixture with hydrogen may be used provided proper purity is obtainable.

The boron powder may be shaped, molded or compacted prior to the sintering operation. The preferred practice is to compact under pressure and the compacted article exhibits sufficient strength to avoid loss of shape and crumbling in being transferred from one position to another. The shaped article may be placed on a beryllium oxide support during the heating operation. Induction heating is the preferred method of reaching the required temperature. Tungsten possesses a high melting point and is well suited for the construction material for heating elements of furnaces used in my process. This is true for both resistance and induction furnaces. Less preferred elements may be constructed of molybdenum and carbon with the latter being the least desirable since carbon may be carried as acetylene into the boron undergoing treatment. Such contamination is not encountered when tungsten and molybdenum are employed in these furnaces. The induction method of heating has been used in my development work and will be referred to in more detail in this disclosure.

A preferred furnace is heated by induction methods and is contained within a silica chamber, the latter being used for atmosphere control. The inductor may be located outside of the chamber while the boron article is placed in the center of the same. The boron is conveniently supported on a beryllia block and immediately surrounded by the cylindrical heating element. The silica chamber must be protected from the intense heat and this is accomplished by radiation shields made of tungsten (or molybdenum) which are tubular in shape and slotted to avoid induction heating. Two or more of these are used and are placed concentric to the heating element. Obviously, they are made of thin metal, have greater diameters than the heating element and are maintained out of electrical contact with each other. Other precautions may be taken to protect the silica walls from the heat by using either metal or non-metal shields beyond the influence of the inductor. Such an assembly permits the obtainment of the required temperature and one may exclude the reactive gases. A vacuum may be maintained within the chamber if properly constructed or a hydrogen atmosphere of any desired pressure may be had.

The following examples are presented for illustrative purposes and are not to be regarded as limitations of the invention, but rather as specific methods of producing the sintered boron articles:

Example I

Boron bromide gas and hydrogen gas were admitted to a silica flask having a temperature of 850° C. while maintaining the ratio of the reactants at ten parts by weight of the bromide to one part by weight of the hydrogen. Reaction took place in the flask yielding a powdered boron product which was removed and molded under slight pressure to get a small disk about 1" in diameter and ⅛" thick. This disk was placed on a beryllia plate contained in an induction furnace of the design described above. A stream of pure gaseous hydrogen was passed into the apparatus as the temperature was raised to 2100° C. which was maintained for thirty minutes. Cooling was then effected and a porous sintered article was removed which displayed very high electrical resistance making it useful in electronic apparatus.

Example II

Boron powder as provided in Example I was pressure compacted to a small disk and placed in the furnace also described above. The chamber was swept free of air by use of a hydrogen stream prior to the heating up operation and a temperature of 2000° C. was reached and maintained for one hour. The sintered article was similar to that of Example I in that it possessed great hardness, high mechanical strength, and a very high electrical resistance particularly at room temperature.

Example III

Boron powder as provided in Example I was pressure compacted to a small disk and placed in the electric furnace also described above. Heat was applied and the air removed by gaseous hydrogen which was slowly passed over the compacted article before and during the time that the temperature of the latter as determined by optical methods was raised to 1500° C. The hydrogen supply was then shut off and the furnace chamber evacuated to obtain a rarefied atmosphere. Heating was continued until the boron reached a temperature of 2100° C.

The method used in Example III is preferred where carbon elements or carbon radiation shields are used in furnace construction. Hydrogen may react with carbon at the highest temperature to form acetylene and this gas in turn may react in contact with boron to give an impure article. By evacuating at temperatures in excess of 1000°–1500° C. the amount of hydrogen present is greatly diminished and less danger of contamination is encountered.

The powdered boron used in the above examples was produced from boron bromide by reduction with hydrogen gas. This is a preferred method of obtaining boron suitable for the sintering operation. Freedom from oxygen is readily avoided as neither the reactants nor the reaction product contain oxygen when proper precautions are taken. Furthermore, the boron is obtainable in a relatively uniform powdered condition and is well suited for the sintering process.

The boron powder as produced from boron bromide seems to change upon standing in contact with oxygen and this may be due to the adsorption of an oxide film or of a coating of boric oxide on the surface of the particles. This condition is corrected by my use of a hydrogen atmosphere during the sintering operation and any oxygen which may have been present in the boron is removed by the operation.

The melting point of boron is given in the literature as 2300° C. but I am able to prepare a rigid article from boron powder at temperatures as low as 1800° C., which is 500° below the melting point. The usual sintering temperature which I employ is between 2000° and 2200° C. and it is understood that at the higher temperature one does not have to continue the heating for an extended period of time, while a longer time at a given temperature is required in the lower portion of this range.

Hydrogen containing gas has been specified in the examples for the atmosphere surrounding the boron article during the sintering operation. Oxygen and nitrogen react with boron and accordingly they must be excluded from the system and pure hydrogen and helium or other pure inert gas are regarded as suitable for maintenance over the boron. It is obvious that these may be mixed in suitable proportions although hydrogen may be used under reduced pressure but with the disadvantage of a more complicated and more expensive type of apparatus. A complete explanation of the role played by hydrogen in the process is not well understood but we do know that it is effective in lowering the sintering temperature several hundred degrees and this effect is most marked when the boron powder has been exposed to an oxygen containing atmosphere prior to its compaction and sintering, suggesting the removal of an oxide coating by the hydrogen. Boron is a non-metal and gaseous compounds of boron and hydrogen are well known. These compounds are all thermally unstable. The possibility of formation and decomposition of boron hydrides within the pressed boron article, allowing the physical transport of boron within the article, may in part account for the results realized. The hydrides of boron might be used in place of hydrogen to obtain this effect. While these hypotheses are offered in explanation of the mechanism of the sintering action, I do not wish to be limited to such explanations of my novel process.

As many apparently widely different embodiments of this invention may be made without departing from the spirit and scope thereof, it is to be understood that I do not limit myself to the specific embodiment except as defined in the appended claims.

I claim as my invention:

1. A process for the production of rigid boron articles which comprises compacting pure boron powder, heating same in preshaped form on a beryllium oxide support to a temperature of between about 1800° C. and 2000° C. in an atmosphere of hydrogen and in the absence of gaseous oxygen and nitrogen and then continuing said heating to effect sintering under subatmospheric pressure.

2. A process for the production of rigid boron articles through the sintering of pure, powdered boron at temperatures below the melting point of said boron, which comprises sintering preshaped, pure, powdered boron on a beryllium oxide support at a temperature ranging from 1800–2000° C. in an atmosphere of hydrogen and in the absence of gaseous oxygen and nitrogen.

3. A process for the production of rigid boron articles through the sintering of pure, powdered boron at temperatures below the melting point of said boron which comprises reducing boron bromide at temperatures ranging from 700–1000° C. with hydrogen to obtain pure, finely-divided boron, compacting and molding the resulting boron product into desired physical shape, and then sintering the molded product on a beryllium oxide support at a temperature of between 1800–2000° C. in an atmosphere of hydrogen and in the absence of gaseous oxygen and nitrogen.

4. A process for the production of rigid boron articles through the sintering of pure, powdered boron at temperatures below the melting point of said boron, which comprises reducing boron bromide at a temperature of about 850° C. with hydrogen, while maintaining a ratio of the reactants at 10 parts by weight of said bromide to 1 part by weight of said hydrogen, molding the resulting pure boron product under pressure into the desired preshaped article, and then sintering the molded article on a beryllium oxide support for a period of 30 minutes at a temperature of about 2100° C. in an atmosphere of pure gaseous hydrogen and in the absence of gaseous oxygen and nitrogen.

THEODORE D. McKINLEY.

REFERENCES CITED

The following references are of record in the file of this patent:

UNITED STATES PATENTS

| Number | Name | Date |
| --- | --- | --- |
| 969,064 | Kuzel | Aug. 30, 1910 |
| 1,026,384 | Coolidge | May 14, 1912 |
| 1,071,488 | Weintraub | Aug. 26, 1913 |
| 2,108,513 | Shardlow | Feb. 15, 1938 |
| 2,122,053 | Burkhardt | June 28, 1938 |

OTHER REFERENCES

Laubengayer et al.: "Preparation and Properties of Pure Crystalline Boron"; Journal of the American Chem. Soc., October 1943, vol. 65, pp. 1924 thru 1931.

Wulff: "Powder Metallurgy"; publ. American Soc. for Metals, 1942; Chapter 25, esp. "Sintering Atmospheres," page 288.